United States Patent
Moore, Jr. et al.

(10) Patent No.: US 6,916,210 B2
(45) Date of Patent: Jul. 12, 2005

(54) ELECTRIC POWER SUPPLY CONNECTOR FOR SEALED COMPRESSOR

(75) Inventors: Billy W. Moore, Jr., Hot Springs, AR (US); Scott E. Westberg, Arkadelphia, AR (US)

(73) Assignee: Carrier Corporation, Syracuse, NY (US)

(*) Notice: Subject to any disclaimer, the term of this patent is extended or adjusted under 35 U.S.C. 154(b) by 1 day.

(21) Appl. No.: 10/374,401

(22) Filed: Feb. 26, 2003

(65) Prior Publication Data

US 2003/0151861 A1 Aug. 14, 2003

Related U.S. Application Data

(62) Division of application No. 09/859,390, filed on May 17, 2001, now abandoned, which is a division of application No. 09/115,463, filed on Jul. 14, 1998, now Pat. No. 6,290,528.

(51) Int. Cl.$^7$ .............................................. H01R 13/62
(52) U.S. Cl. ........................ 439/685; 439/362; 439/598; 439/651; 439/689; 439/936
(58) Field of Search ................................ 439/685, 362, 439/598, 651, 689, 936, 682, 695, 638, 650

(56) References Cited

U.S. PATENT DOCUMENTS

| | | | |
|---|---|---|---|
| 3,617,985 A | * | 11/1971 | Kehl ........................... 439/341 |
| 4,059,325 A | | 11/1977 | Diminnie |
| 4,109,992 A | | 8/1978 | Hughes |
| 4,227,764 A | | 10/1980 | Fiske |
| 4,252,394 A | | 2/1981 | Miller |
| 4,433,206 A | * | 2/1984 | Lewis ........................ 174/35 C |
| 4,523,798 A | | 6/1985 | Barrows |
| 4,584,433 A | | 4/1986 | Bowsky |
| 4,654,470 A | | 3/1987 | Feldman |
| 4,712,157 A | | 12/1987 | Simonson |
| 4,827,502 A | | 5/1989 | Suffi |
| 4,840,547 A | | 6/1989 | Fry |
| 4,915,638 A | | 4/1990 | Domian |
| 4,921,454 A | | 5/1990 | Atherton |
| 4,984,973 A | | 1/1991 | Itameri-Kinter |
| 4,998,891 A | | 3/1991 | Bresko |
| 5,007,854 A | | 4/1991 | Crespiatico |
| 5,035,653 A | | 7/1991 | Honkomp |
| 5,084,596 A | | 1/1992 | Borsh |
| 5,091,821 A | | 2/1992 | Peyton |
| 5,120,237 A | | 6/1992 | Fussell |
| 5,126,608 A | | 6/1992 | Sogabe |
| 5,129,843 A | | 7/1992 | Bowsky |
| 5,145,388 A | | 9/1992 | Brownlie |
| 5,145,417 A | * | 9/1992 | Honkomp et al. .......... 439/685 |
| 5,173,057 A | | 12/1992 | Bunch |
| 5,194,012 A | | 3/1993 | Cairns |
| 5,199,898 A | | 4/1993 | Wisner |
| 5,239,129 A | | 8/1993 | Ehrenfels |
| 5,244,408 A | | 9/1993 | Muller |
| 5,252,083 A | | 10/1993 | Correnti |
| 5,256,072 A | | 10/1993 | Hatagishi |
| 5,272,297 A | | 12/1993 | Reichow |
| 5,336,105 A | | 8/1994 | Wisner |
| 5,391,061 A | | 2/1995 | Iizuka |
| 5,425,626 A | | 6/1995 | Tojo |
| 5,430,619 A | | 7/1995 | Lindenbaum |
| 5,769,659 A | | 6/1998 | Ceylan |
| 5,921,801 A | * | 7/1999 | O'Sullivan et al. ......... 439/362 |
| 6,290,528 B1 | | 9/2001 | Moore, Jr. |

* cited by examiner

*Primary Examiner*—Neil Abrams
(74) *Attorney, Agent, or Firm*—Carlson, Gaskey & Olds

(57) ABSTRACT

A compressor is provided with a fluid tight electrical connector. The electrical connector is sealed against the seal compressor housing, and a cable end connector is detachably attached to a connector housing. Since the cable is separately attached to the connector housing, it is not directly connected to terminal pins in the compressor. This reduces damage to those terminal pins. Further, unique sealing arrangements make the electrical connection fluid tight.

4 Claims, 4 Drawing Sheets

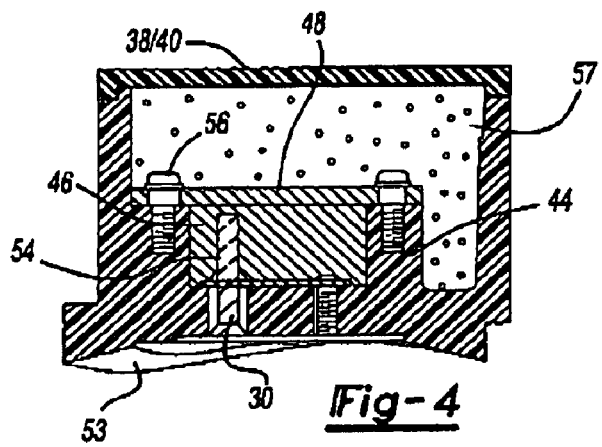
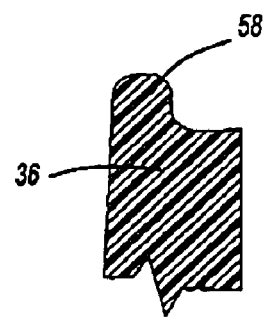
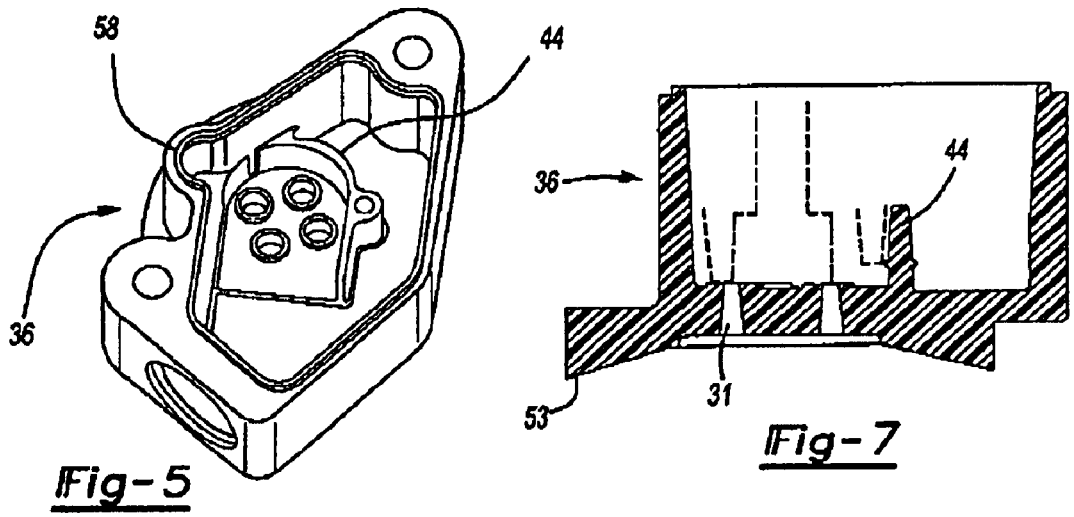
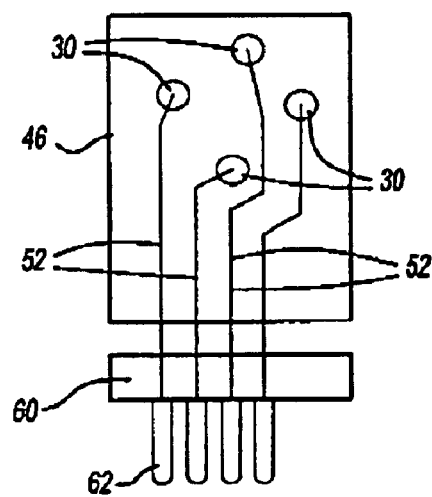
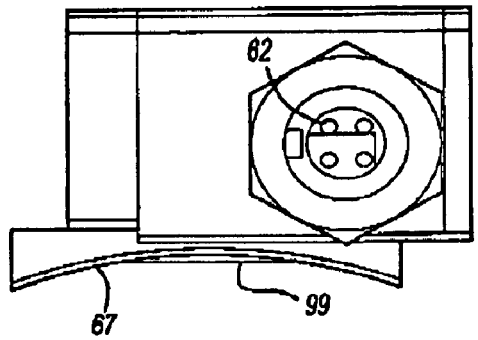

ELECTRIC POWER SUPPLY CONNECTOR FOR SEALED COMPRESSOR

This application is a divisional of Ser. No. 09/859,390, filed 17 May 2001, now abandoned, which was a divisional of Ser. No. 09/115,463, filed 14 Jul. 1998, and now U.S. Pat. No. 6,290,528.

The connector housing 24 is shown attached to the sealed compressor housing 22 in FIG. 3. As shown, the pins 30 extend through openings 31 in the connector housing. A main connector housing body 36 receives covers 38 and 40. Bolts 42 extend into the bosses 32 to secure the connector housing 24 to the sealed compressor housing. An internal wall 44 receives a terminal block 46 which communicates electrical signals from the pins 30 to the cable 26, as will be explained below. A strap 48 secures the terminal block 46 within the housing. The space surrounding the terminal block and strap is filled with a filler material 57, such as an epoxy potting material. A groove 49 of the main connector housing body 36 is supplied within a tough epoxy sealant, such that the connection between the main connector housing body 36 and the covers 38 and 40 provides a fluid type seal. The drawings schematically show a compressor pump unit 51 which is driven by a motor 55. A power supply supplies power from terminal pins 30 to the wires 157, and through to the motor 55. The power supply is preferably a three-phase power supply, and preferably there are four pins, with one of the pins supplying a ground. This is the invention of the above-referenced patent. A seal 53 seals between a forward face of the main connector housing body 36 and the sealed compressor housing 22. A space 17 spaces weld ring 29 from the main connector housing body 36. The combination of all of the sealing provides a fluid type seal such that this compressor could be placed in a submerged location, and yet water would not leak through the connector housing. A separate cable connector 50 is inserted into the main connector housing body 36, and includes appropiate seals for providing a fluid tight seal between the cable 26 and the cable connector 50. Again, the fluid type seal will allow the entire compressor to be submerged. Since the cable is connected to a separate part, it can be easily removed without applying any force to the terminal pins 30. Thus, damage which may have occurred in the past is avoided.

FIG. 4 shows connector housing 24 including a flat for sealing ring 53 which seals on the outer surface of the sealed compressor housing 22. A wall 44 receives bolts 56 to secure the strap 48. A plurality of openings 54 are formed within connector housing body 36 to receive the pins 30. As shown, potting material 57 fills the connector housing 24.

FIG. 10 shows cover 40. As shown, groove 49 surrounds the periphery of the lid. A sealant, preferably an epoxy sealant 100 is placed in the groove 49 before the lid is placed on the main housing (see FIG. 11). The groove and sealant then seals on to the tongue 101 on the main housing such as shown in FIG. 3.

SUMMARY OF THE INVENTION

In a disclosed embodiment of this invention, a separate connector housing is attached to a sealed compressor housing. A cable is connected to a connection at one end of the housing, and terminal pins from the connector housing are received within mating pin structure within a connector block. A terminal block has appropriate circuitry for communicating the terminal pins in the sealed housing to connectors for the cable at the other end of the connector block. The connector housing is preferably attached to the sealed compressor housing with some mechanical attachment structure. In one embodiment, bolts are utilized. Preferably, bolt bosses are welded to the outer surface of the sealed compressor housing to receive the mechanical attachment structure, which may be bolts. The cable is separately connected to the connector housing such that when the cable is removed, there is no force on the terminal pins in the connector housing.

Structurally, the connector housing preferably includes an internal wall which receives the terminal block to receive the terminal pins. This connector housing provides proper positioning for the terminal block such that the terminal block is properly received. A strap secures the terminal block within the connector housing. The terminal block is preferably formed with openings to receive the terminal pins from the sealed compressor housing, and has appropriate circuitry connected to the terminal pins for the cable.

Further, sealing elements are preferably placed on the connector housing to surround the connection of the terminal pins within the compressor housing. Further sealing elements are placed in the connector housing at appropriate locations to define a fluid-tight seal. Also, the entire interior of the connector housing is preferably encased in a filler material such as a potting material, further enhancing the fluid-tight seal.

These and other features of the present invention can be best understood from the following specification and drawings, the following of which is a brief description.

BRIEF DESCRIPTION OF THE DRAWINGS

FIG. 4 is a cross-sectional view along a different plane from that of FIG. 3, and through the connector housing.

FIG. 5 shows a portion of the connector housing.

FIG. 6 is a cross-sectional view generally along lines 6—6 as shown in FIG. 5.

FIG. 7 is a view through a connector housing portion according to the present invention.

FIG. 8 schematically shows the connections of the present invention.

FIG. 9 is a bottom view of the connector housing.

DETAILED DESCRIPTION

A compressor 20 includes a sealed compressor housing 22 which seals a compressor pump unit and motor, as known. An electrical power connector housing 24 is attached to the sealed compressor housing 22. A cable 26 is secured to the connector housing 24 and supplies electrical power to the compressor 20.

Figure 1:
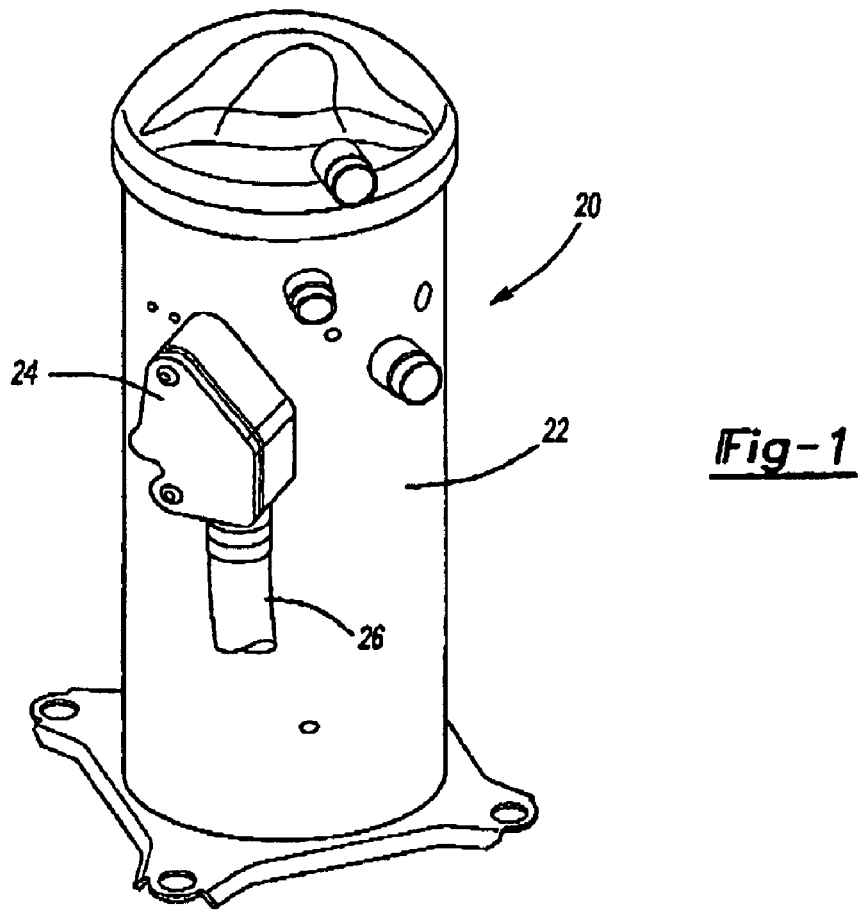
FIG. 1 is a perspective view of a compressor incorporated in the inventive connector housing.
Figure 2:
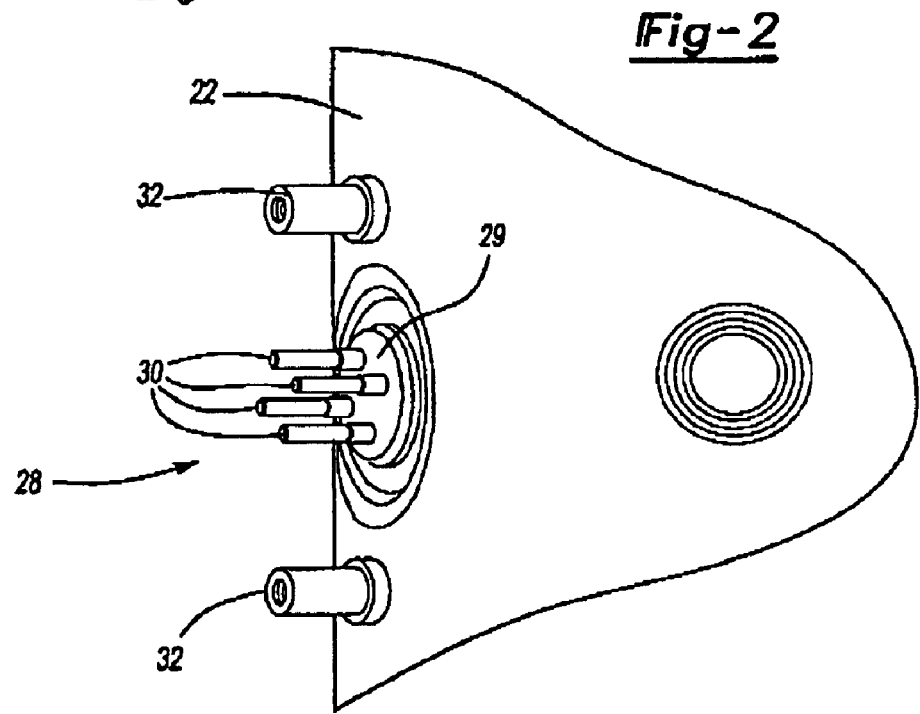
FIG. 2 is the compressor of FIG. 1 without the connector housing.

As shown in FIG. 2, the sealed compressor housing 22 includes an electrical connection at 28. Connection 28 includes pins 30 received within a weld ring 29. The weld ring is welded to the sealed compressor housing 22 and pins 30 are connected to the motor. The structure of the pins is better described in co-pending patent application Ser. No. 09/105,135, entitled "INTEGRAL GROUND PIN FOR SEALED COMPRESSOR", now U.S. Pat. No. 6,028,523.

Figure 3:
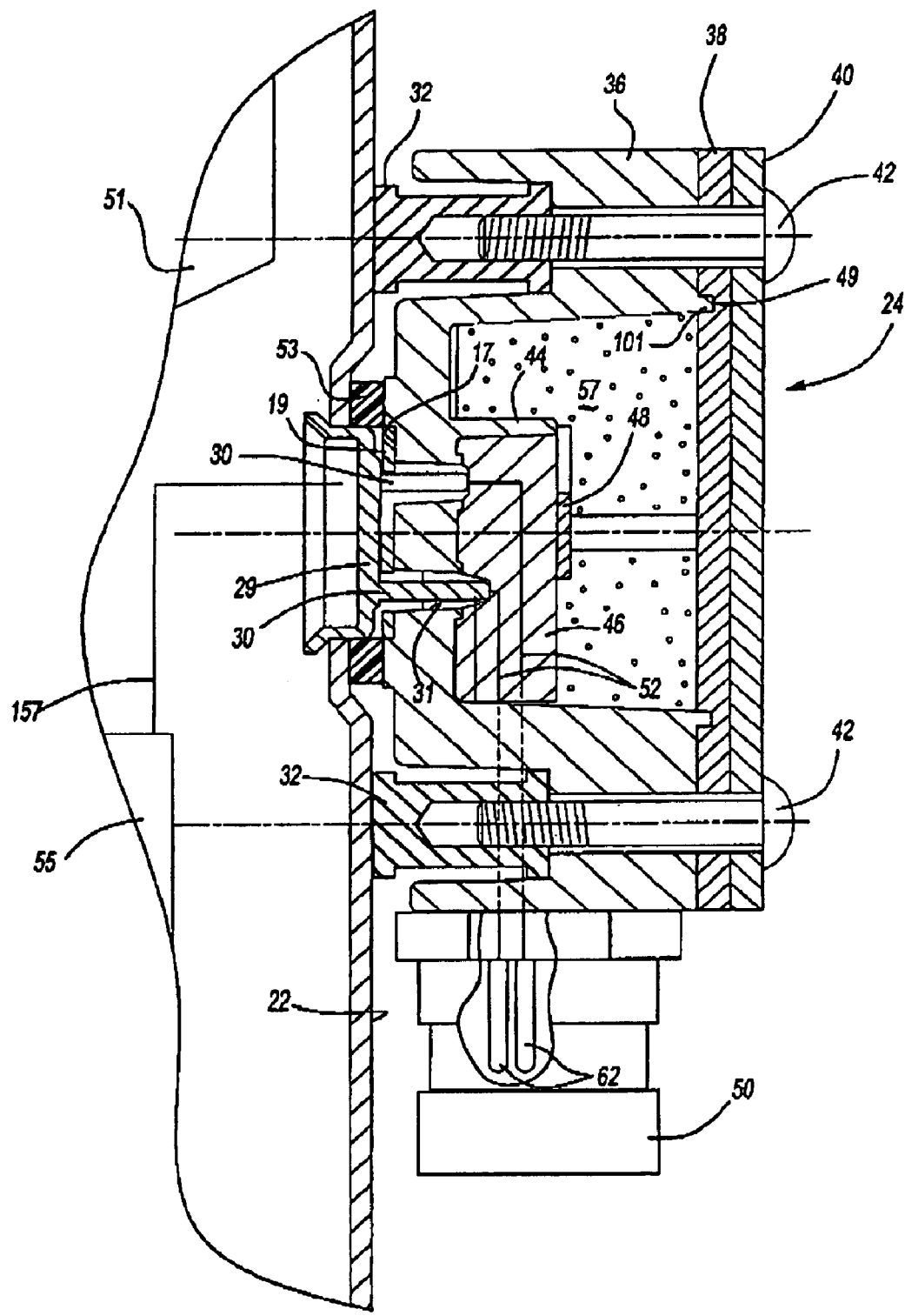
FIG. 3 is a cross-sectional view through the connector housing.

The connector housing 24 is shown attached to the sealed compressor housing 22 in FIG. 3. As shown, the pins 30 extend through openings 31 in the connector housing. A main connector housing body 36 receives a cover 38 and 40. Bolts 42 extend into the bosses 32 to secure the connector housing 24 to the sealed compressor housing. An internal wall 44 receives a terminal block 46 which communicates electrical signals from the pins 30 to the cable 26, as will be explained below. A strap 48 secures the terminal block 46 within the housing. The space surrounding the terminal block and strap is filled with a filler material 57, such as an epoxy potting material. A groove 49 of the main connector housing body 36 is supplied within a tough epoxy sealant, such that the connection between the main connector housing body 36 and the covers 38 and 40 provides a fluid type seal. The drawings schematically show a compressor pump unit 51 which is driven by a motor 55. A power supply supplies power from terminal pins 30 to the wires 157, and through to the motor 55. The power supply is preferably a three-phase power supply, and preferably there are four pins, with one of the pins supplying a ground. This is the invention of the above-referenced patent. A seal 53 seals between a forward face of the main connector housing body 36 and the sealed compressor housing 22. A space 17 spaces weld ring 29 from the main connector housing body 36. The combination of all of the sealing provides a fluid type seal such that this compressor could be placed in a submerged location, and yet water would not leak through the connector housing. A separate cable connector 50 is inserted into the main connector housing body 36, and includes appropriate seals for providing a fluid tight seal between the cable 26 and the cable connector 50. Again, the fluid type seal will allow the entire compressor to be submerged. Since the cable is connected to a separate part, it can be easily removed without applying any force to the terminal pins 30. Thus, damage which may have occurred in the past is avoided.

Weld bosses 32 are welded to the other surface of the sealed compressor housing 22 and receive bolts to connect the connector housing 24, as will be described below.

FIG. 4 shows connector housing 24 including a flat for sealing ring 53 which seals on the outer surface of the sealed compressor housing 22. A wall 44 receives bolts 56 to secure the strap 48. A plurality of openings 54 are formed within block 36 to receive the pins 30. As shown, potting material 57 fills the housing 24.

FIG. 5 shows the wall 44 within the interior of the main connector housing body 36. A sealing lip 58 surrounds an opening into the main connector housing body 36. The cover 40 is received on the main connector housing body 36 to close this opening. The sealing lip 58 provides a fluid tight seal at that connection.

As shown in FIG. 6, the sealing lip 58 extends outwardly of main connector housing body 36.

As shown in FIG. 7, a sealing element 53 surrounds the inner surface of the main connector housing body 36.

FIG. 8 schematically shows the terminal block 46 receiving the terminal pins 30. Appropriate wiring 52 connects the terminal pins 30 to a cable connector 60 having associated pins 62. Although pins are shown at both 30 and 62, it should be understood that either or both of these elements could be receptors rather than the pin elements.

FIG. 9 shows the main connector housing body 36, and the cable connector 60 including the pins 62. The curved surface 67 of the main connector housing body 36 faces the outer periphery of the curved outer surface of the sealed compressor housing 22 and provides a splash guard. Since the inventive compressor may well be utilized in applications where it will be exposed to water, the splash guard prevents water from reaching the seal between the connector housing and the sealed compressor housing. The inventive connector is especially directed to compressors which are utilized in refrigeration transport containers. That is, refrigerated containers transported on boats, etc. Such compressors may well be exposed to water, and the invention is thus directed to providing a very good seal for this application.

As can be seen in FIG. 9, there is a flat surface 99 radially inwardly of the curved surface 67. That flat surface receives the seal 53 such as shown in FIG. 3. The combination of the flat surface and the curved surface ensure that there is a fluid tight seal at the sealed compressor housing, and that that seal is not exposed to an undue amount of water due to the splash guard of the curved surface 67.

Figure 10:
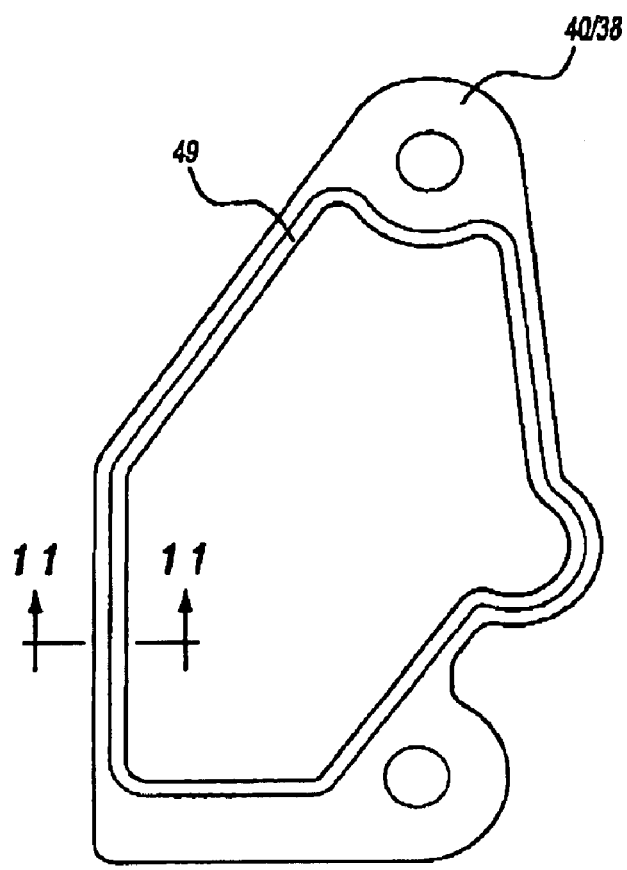
FIG. 10 shows the housing lid.
Figure 11:
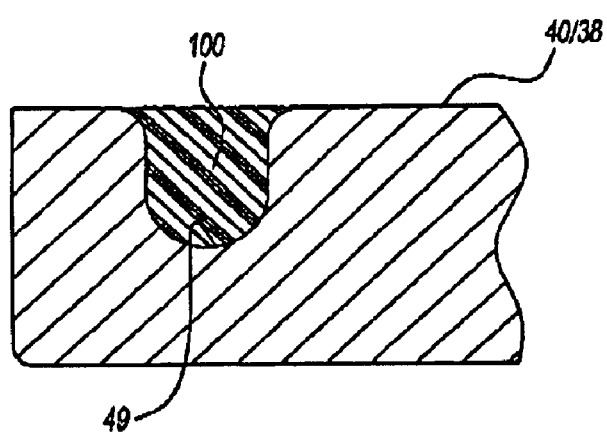
FIG. 11 is a cross-sectional view along line 11—11 of FIG. 10.

FIG. 10 shows lid 40. As shown, groove 49 surrounds the periphery of the lid. A sealant, preferably an epoxy sealant 100 is placed in the groove 49 before the lid is placed on the main housing (see FIG. 11). The groove and sealant then seals on to the tongue 101 on the main housing such as shown in FIG. 3.

While an epoxy is the preferred filler material in this application, other filler materials such as RTB, silicone materials, etc., can be utilized.

A preferred embodiment of this invention has been disclosed; however, a worker of ordinary skill in the art would recognize that certain modifications come within the scope of this invention. For that reason, the following claims should be studied to determine the true scope and content of this invention.

What is claimed is:

1. A sealed compressor comprising:

a sealed compressor housing enclosing a compressor pump unit and an electrical motor for driving said compressor pump unit, and a power supply for supplying electrical power to said electrical motor;

said power supply communicating with terminal pins extending through said sealed compressor housing;

an electrical connector housing received on an outer surface of said sealed compressor housing, said electrical connector housing having a plastic body including openings for passage of said terminal pins into an interior of said connector housing, said electrical connector housing being secured to an outer surface of said sealed compressor housing at a location other than said openings; and said interior of said connector housing including a terminal block receiving said electrical connector pins, and said terminal block communicating with connector pins on an outer surface of said connector housing, and a potting material received around said terminal block and within said interior of said connector housing and wherein a strap secures said terminal block to said connector housing.

2. A compressor as set forth in claim 1, wherein an outer plate encloses said interior of said connector housing.

3. A compressor as set forth in claim 1, wherein said electrical connector housing is secured to said sealed compressor housing by bolts.

4. A compressor as set forth in claim 3, wherein bosses are formed on an outer periphery of said sealed compressor housing and said bolts extend into said bosses.

* * * * *